(12) United States Patent
Qiu et al.

(10) Patent No.: US 11,237,438 B2
(45) Date of Patent: Feb. 1, 2022

(54) DISPLAY SUBSTRATE, FABRICATING METHOD THEREOF, AND DISPLAY APPARATUS

(71) Applicants: FUZHOU BOE OPTOELECTRONICS TECHNOLOGY CO., LTD., Fujian (CN); BOE Technology Group Co., Ltd., Beijing (CN)

(72) Inventors: Xinmao Qiu, Beijing (CN); Zongxiang Li, Beijing (CN); Jin Wang, Beijing (CN); Yao Liu, Beijing (CN); Min Zhou, Beijing (CN); Hao Cheng, Beijing (CN); Zuwen Liu, Beijing (CN)

(73) Assignees: FUZHOU BOE OPTOELECTRONICS TECHNOLOGY CO., LTD., Fujian (CN); BOE TECHNOLOGY GROUP CO., LTD., Beijing (CN)

( * ) Notice: Subject to any disclaimer, the term of this patent is extended or adjusted under 35 U.S.C. 154(b) by 66 days.

(21) Appl. No.: 16/638,252

(22) PCT Filed: Sep. 26, 2019

(86) PCT No.: PCT/CN2019/108201
§ 371 (c)(1),
(2) Date: Feb. 11, 2020

(87) PCT Pub. No.: WO2020/147341
PCT Pub. Date: Jul. 23, 2020

(65) Prior Publication Data
US 2021/0232007 A1  Jul. 29, 2021

(30) Foreign Application Priority Data

Jan. 14, 2019 (CN) .......................... 201910032382.9

(51) Int. Cl.
*G02F 1/1362* (2006.01)
*G02F 1/1368* (2006.01)

(52) U.S. Cl.
CPC ...... *G02F 1/136209* (2013.01); *G02F 1/1368* (2013.01); *G02F 1/136222* (2021.01)

(58) Field of Classification Search
None
See application file for complete search history.

(56) References Cited

U.S. PATENT DOCUMENTS

2004/0095527 A1* 5/2004 Liao .................. G02F 1/133514
349/106
2015/0016145 A1 1/2015 Motooka et al.

FOREIGN PATENT DOCUMENTS

| CN | 1900750 A | 1/2007 |
| CN | 101169484 A | 4/2008 |

(Continued)

OTHER PUBLICATIONS

International Search Report dated Dec. 27, 2019, issued in counterpart International Application No. PCT/CN2019/108201 (11 pages).

(Continued)

*Primary Examiner* — James A Dudek
(74) *Attorney, Agent, or Firm* — Westerman, Hattori, Daniels & Adrian, LLP

(57) ABSTRACT

The present disclosure relates to a display substrate. The display substrate may include a base substrate, a light filtering layer on the base substrate, a plurality of light blocking grooves in the light filtering layer, and a plurality of light blocking strips in the plurality of light blocking grooves respectively. The plurality of light blocking strips may be configured to block light from viewing angles outside a visible range of the display substrate.

15 Claims, 11 Drawing Sheets

(56) References Cited

FOREIGN PATENT DOCUMENTS

| | | |
|---|---|---|
| CN | 103591514 A | 2/2014 |
| CN | 104614892 A | 5/2015 |
| CN | 104808383 A | 7/2015 |
| CN | 106647013 A | 5/2017 |
| CN | 108169950 A | 6/2018 |
| CN | 108919403 A | 11/2018 |
| CN | 109633967 A | 4/2019 |
| JP | 2015138180 A | 7/2015 |
| KR | 20080061721 A | 7/2008 |
| WO | WO-2018166260 A1 * | 9/2018 ....... G02F 1/133512 |

OTHER PUBLICATIONS

Office Action dated Apr. 22, 2020, issued in counterpart CN Application No. 201910032382.9, with English translation (23 pages).

* cited by examiner

DISPLAY SUBSTRATE, FABRICATING METHOD THEREOF, AND DISPLAY APPARATUS

CROSS-REFERENCE TO RELATED APPLICATIONS

This application claims benefit of the filing date of Chinese Patent Application No. 201910032382.9 filed on Jan. 14, 2019, the disclosure of which is hereby incorporated in its entirety by reference.

TECHNICAL FIELD

The present disclosure relates to display technologies, and in particular to a display substrate, a method of fabricating the same, and a display apparatus.

BACKGROUND

With the development of display technology, display devices such as mobile phones and computers are becoming more and more widely used. Generally, the screen of a display device has a large viewing angle, and users can see the content on the screen from different viewing angles. However, users do not desire information displayed on the screen to be seen by people around in some situations. Anti-peep protection of the display device is receiving more attention.

A display device with anti-peep protection is commonly applied with an anti-peep film on the screen to filter out light of large viewing angles while allowing transmission of light perpendicular to the screen. Therefore, people at the position of large viewing angles cannot see the content on the screen. The fabrication of anti-peep films involves complicated processes, and it is challenging to achieve high integration with the display screen.

BRIEF SUMMARY

One embodiment of the present disclosure is a display substrate. The display substrate may include a base substrate, a light filtering layer on the base substrate, a plurality of light blocking grooves in the light filtering layer, and a plurality of light blocking strips in the plurality of light blocking grooves respectively. The plurality of light blocking ships may be configured to block light from viewing angles outside a visible range of the display substrate.

Optionally, a depth of each of the light blocking grooves may be equal to a thickness of the light filtering layer within a range of about 50 nm to about 500 nm, and a sidewall of each of the light blocking grooves may be perpendicular to the base substrate.

Optionally, the plurality of light blocking strips may comprise a first type light blocking strip and/or a second type light blocking strip, the first type light blocking strip may be arranged in a first direction, the second type light blocking strip may be arranged in a second direction, and the first direction and the second direction may be perpendicular to each other in a plane of the light filtering layer.

Optionally, the display substrate may further comprise a plurality of sub-pixels arranged in an array, and more than one of the plurality of light blocking strips passes through a region corresponding to each of the sub-pixels.

Optionally, the light filtering layer may comprise a plurality of color filter portions having at least two colors; each of the plurality of color filter portions corresponds to at least one of the sub-pixels, and each sub-pixel corresponding to a same color filter portion may display a same color.

Optionally, the light filtering layer may be transparent, and the display substrate may further comprise a sub-wavelength grating layer, the sub-wavelength grating layer may comprise a plurality of grating units having at least two patterns, each of the patterns of the grating units may be configured to selectively transmit light of a color band, and different patterns of the grating units may allow light of different color bands to transmit.

Optionally, the sub-wavelength grating layer may be disposed at a side of the base substrate facing the light filtering layer, each of the grating units in the sub-wavelength grating layer may comprise a plurality of first grating strips spaced apart at the side of the base substrate facing the light filtering layer.

Optionally, the sub-wavelength grating layer may be disposed at a side of the light filtering layer opposite from the base substrate, each of the grating units in the sub-wavelength grating layer may comprise a plurality of second grating ships spaced apart at the side of the light filtering layer opposite from the substrate; or a plurality of grating grooves may be spaced apart on a surface of the light filtering layer opposite from the substrate and each of the grating units may comprise a plurality of third grating strips, the third grating strips may be correspondingly disposed in the grating grooves; or the plurality of grating grooves may be spaced apart on a surface of the light filtering layer opposite from the substrate, and each of the grating units may comprise a plurality of fourth grating strips and a plurality of fifth grating strips, the fourth grating strips may be correspondingly disposed in the grating grooves, and the fifth grating strips may be correspondingly disposed on surfaces of the light filtering layer between two adjacent grating grooves.

Optionally, a material of the light filtering layer may comprise a negative photoresist, and a material of the light blocking ships may comprise a positive photoresist; or a material of the light filtering layer may comprise a positive photoresist, and a material of the light blocking strips comprises a negative photoresist.

Optionally, the display substrate may comprise a color filter substrate comprising the light filtering layer.

Optionally, the display substrate may further comprise a thin film transistor array, and the light filtering layer may be disposed on a side of the thin film transistor array opposite from the base substrate.

One embodiment of the present disclosure is a display apparatus. The display apparatus may comprise the display substrate.

One embodiment of the present disclosure is a method of fabricating a display substrate. The method of fabricating a display substrate may comprise: providing a base substrate; forming a light filtering layer on the base substrate; performing a first patterning process on the light filtering layer, thereby forming a plurality of light blocking grooves in the light filtering layer; covering the light filtering layer with a layer of light blocking material, wherein a portion of the light blocking material is filled into the light blocking grooves; and removing the layer of light blocking material outside the light blocking grooves, thereby forming a plurality of light blocking strips.

Optionally, removing the layer of light blocking material outside the light blocking grooves may comprise performing a second patterning process to remove the light blocking material, and a pattern of a mask used in the first patterning process is the same as that in the second patterning process.

Optionally, the light filtering layer may be transparent. The method may further comprise forming a sub-wavelength grating layer. The sub-wavelength grating layer may comprise a plurality of grating units. The plurality of grating units may comprise at least two patterns. Each of the patterns of the grating units may be configured to selectively transmit light of a color band, and different patterns of the grating units may allow light of different color bands to transmit.

Optionally, forming the sub-wavelength grating layer may comprise: depositing a layer of sub-wavelength grating material on a surface of the base substrate before forming the light filtering layer on the base substrate; and performing a patterning process on the layer of sub-wavelength grating material, thereby forming first grating strips, wherein each of the grating units comprises a plurality of the first grating strips.

Optionally, forming the sub-wavelength grating layer may comprise: covering a surface of the light filtering layer opposite from the substrate with a layer of sub-wavelength grating material after removing the light blocking material outside the light blocking grooves; performing a patterning process on the layer of sub-wavelength grating material to form second grating grips, wherein each of the grating units comprises a plurality of the second grating strips.

Optionally, forming the sub-wavelength grating layer may comprise: forming a plurality of grating grooves on a surface of the light filtering layer between adjacent light blocking grooves during the first patterning process to the light filtering layer to form the plurality of light blocking grooves; filling a portion of the light blocking material in the grating grooves during covering the light filtering layer with the layer of light blocking material; removing the light blocking material in the grating grooves during removing the layer of the light blocking material outside the light blocking grooves; and covering the light filtering layer with a layer of sub-wavelength material after removing the light blocking material, thereby forming the sub-wavelength layer comprising a plurality of grating units.

Optionally, covering the light filtering layer with the layer of sub-wavelength material after removing the light blocking material may comprise: depositing the layer of sub-wavelength grating material on the light filtering layer by a vapor deposition process after removing the light blocking material, wherein a portion of the sub-wavelength grating material may be filled in the grating grooves, thereby forming third grating strips, and each of the grating units may comprise a plurality of the third grating strips; or depositing the layer of sub-wavelength grating material on the light filtering layer by a vapor deposition process after removing the light blocking material, wherein a portion of the sub-wavelength grating material may be filled in the grating grooves, thereby forming fourth grating strips, and a portion of the sub-wavelength grating material may be deposited on surfaces of the light filtering layer between adjacent two grating grooves, thereby forming fifth grating strips, and each of the grating units may comprise a plurality of the fourth grating strips and a plurality of the fifth grating strips.

Optionally, removing the light blocking material outside the light blocking grooves may be performed by an ashing process.

BRIEF DESCRIPTION OF THE DRAWINGS

In order to more clearly illustrate the technical solutions in the embodiments of the present disclosure, the drawings of the embodiments will be briefly described below. It is obvious that the drawings in the following description only relate to show some embodiments of the present disclosure and are not limit the disclosure. Other drawings may also be obtained from those of ordinary skill in the art in view of the drawings.

DETAILED DESCRIPTION

Figure 1:
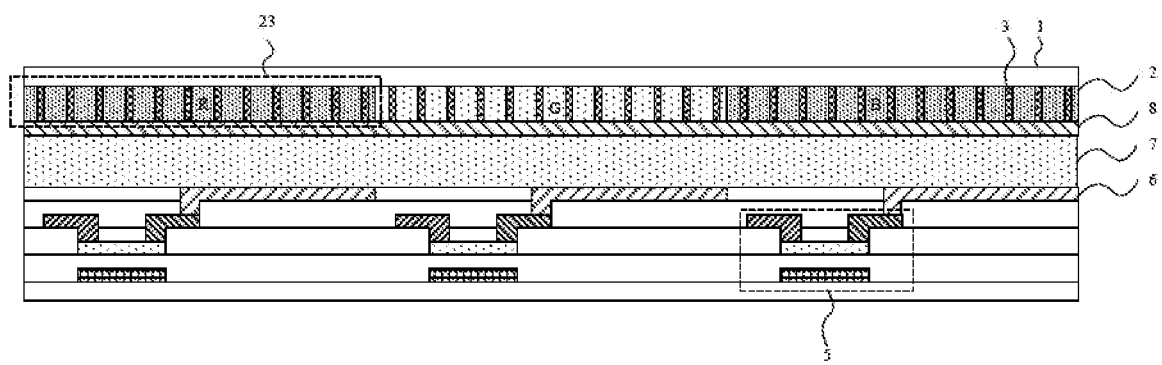
FIG. 1 is a schematic diagram of a display substrate according to one embodiment of the present disclosure.

In order to make the purpose, the technical solution and the advantages of the present disclosure more clearly, the specific embodiments of the fingerprint identification module, fingerprint identification method, and display apparatus provided by the embodiment of the present disclosure are described in details below with reference to the accompanying drawings. It is understandable that the preferred embodiments described herein are intended to illustrate and explain the disclosure and are not intended to limit the disclosure. In the case of no conflict, the embodiments in the present application and the features in the embodiments can be combined with one another. It should be noted that the shapes of the various figures in the drawings do not reflect the true scale, and are merely intended to illustrate the present disclosure. The same or similar reference numerals indicate the same or similar elements or elements having the same or similar functions.

Figure 2:
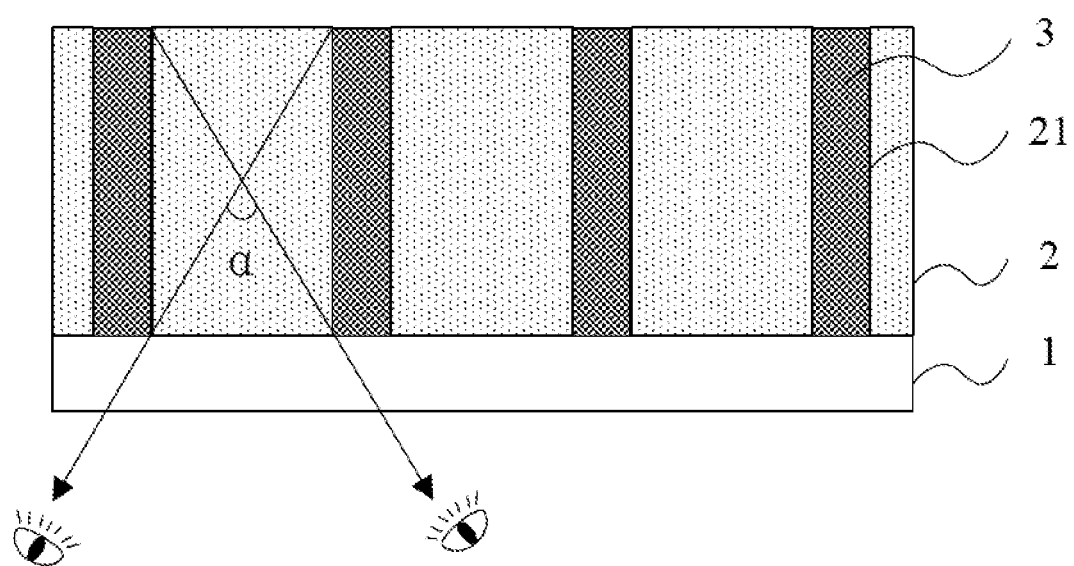
FIG. 2 is a schematic diagram of a light filtering layer of a display substrate provided with light blocking strips according to one embodiment of the present disclosure.

Referring to FIG. 1 and FIG. 2, one embodiment of the present disclosure provides a display substrate. The display substrate includes a base substrate 1 and a light filtering layer 2 on a side of the base substrate 1. A plurality of light blocking grooves 21 are disposed in the light filtering layer 2 and each of the light blocking grooves 21 is provided with a light blocking strip 3 configured to block light from viewing angles outside the visible range of the display substrate.

In some embodiments, the base substrate 1 refers to a substrate as a base layer when the light filtering layer 2 is formed. For example, the display substrate shown in FIG. 1 includes a color filter substrate, a thin film transistor array substrate, and a liquid crystal layer 7 between the two substrates. Two sides of the liquid crystal layer are provided with a common electrode 8 and a pixel electrode 6, wherein the pixel electrode 6 is connected with the thin film transistor 5 through a via hole. In the display substrate of FIG. 1, the light filtering layer 2 is fabricated in the color filter substrate, such that the base substrate 1 may appear above the light filtering layer 2. For convenience of illustration, FIG. 1 is rotated 180° clockwise and then zoomed in a part of the base substrate 1 and the light filtering layer 2 as shown in FIG. 2 to better explain the present disclosure.

The visible range of the display substrate in one embodiment of the present disclosure is illustrated in FIG. 2. When the light blocking strips 3 are disposed in the light filtering layer 2, the visible range of the display substrate is the maximum visible range of the user, that is, the angle α as indicated in FIG. 2. The visible range may be preset according to the use environment or user requirements, and the viewing angle is limited within the visible range by setting the light blocking strips 3.

In one embodiment of the present disclosure, a plurality of light blocking grooves 21 is provided in the light filtering layer 2. The plurality of light blocking grooves 21 may be used to block users' view outside the visible range, thereby limiting the viewing angle of the user to a certain range to achieve anti-peep display. Furthermore, the light blocking grooves are disposed in the light filtering layer 2 to achieve the anti-peep function without applying an anti-peep film on the display screen, thereby improving the integration of the anti-peep layer with the display screen.

The shapes of the light-blocking grooves 21 and the light-blocking strips 3 are not particularly limited. In one embodiment, for example, the shape may be rectangular as shown in FIG. 2, or trapezoidal, s-shaped or a strip shape having a certain angle with the display substrate. The shape of the light blocking ships 3 and the light blocking grooves 21 is not limited herein, provided that the light blocking grooves 21 have a depth or a height in a direction perpendicular to the base substrate 1 and a spacing between the light blocking grooves 21 that meets the requirements of the visible range. The shallower the depth of the light blocking grooves 21 is and the larger the spacing between the light blocking grooves 21 is, the larger the visual range of the user becomes. The spacing between the light blocking grooves 21 may be within a range of about 50 nm to about 1,000,000 nm, and the depth of the light blocking grooves 21 may be within a range of about 50 nm to about 1,000,000 nm. Optionally, the depth of the light blocking grooves 21 may be equal to the thickness of the light filtering layer 2, and the sidewall of the light blocking grooves 21 is perpendicular to the base substrate 1.

The light filtering layer 2 may be a colorful layer in one embodiment. As shown in FIG. 1, in some embodiments, the light filtering layer 2 includes a plurality of color filter portions 23, and the color filter portions 23 may have at least two colors. For example, the color filter portions 23 may have at least two colors of red, green, blue, yellow and so on.

In one embodiment, the display substrate may include a plurality of sub-pixels arranged in an array. Each of the color filter portions 23 corresponds to at least one sub-pixel, and each sub-pixel corresponding to the same color filter portion 23 may display the same color.

Figure 3:
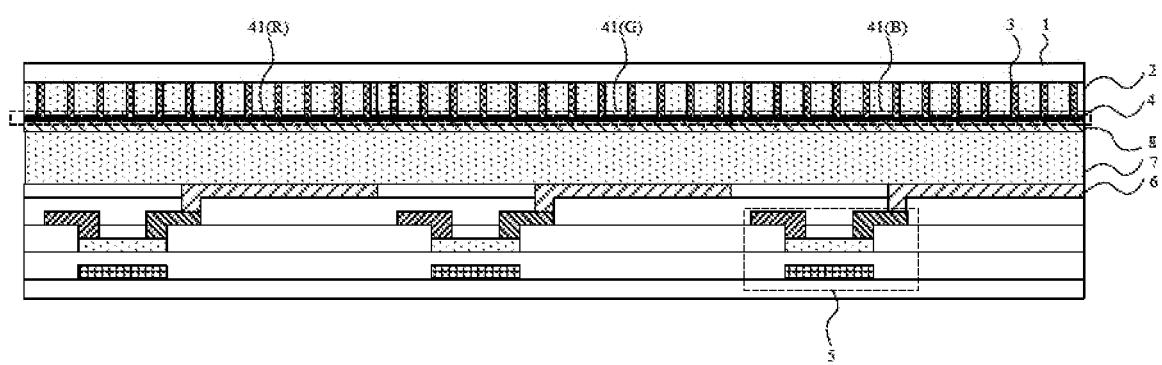
FIG. 3 is a schematic diagram of a display substrate according to one embodiment of the present disclosure.
Figure 4:
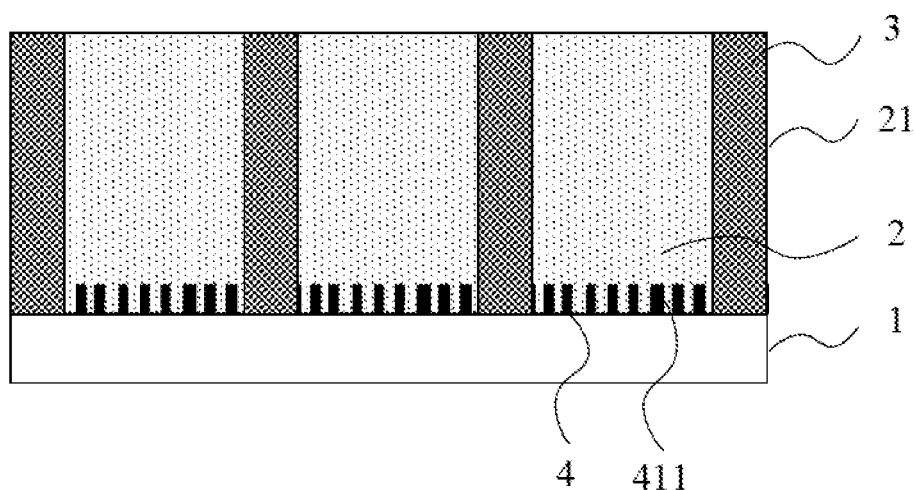
FIG. 4 is a schematic diagram showing a sub-wavelength grating layer and a light filtering layer with light blocking strips of a display substrate according to one embodiment of the present disclosure.
Figure 5:
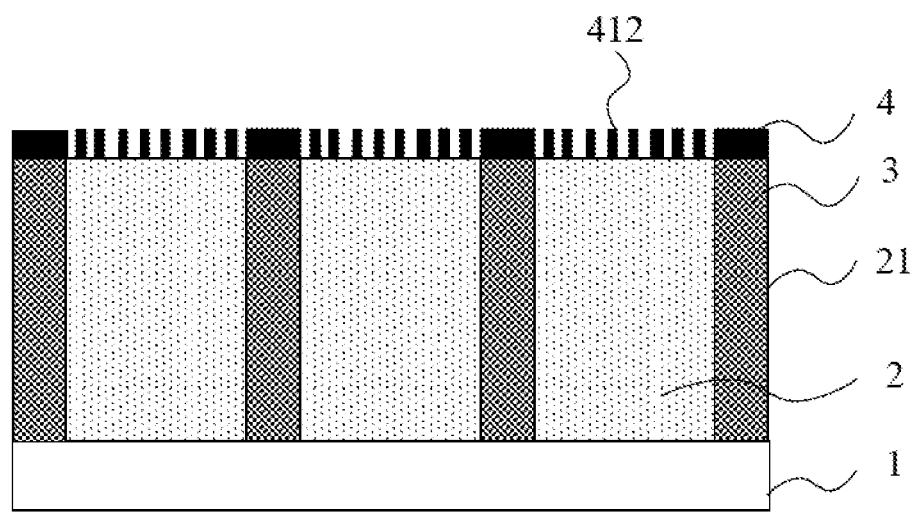
FIG. 5 is a schematic diagram showing a sub-wavelength grating layer and a light filtering layer with light blocking strips of a display substrate according to one embodiment of the present disclosure.
Figure 6:
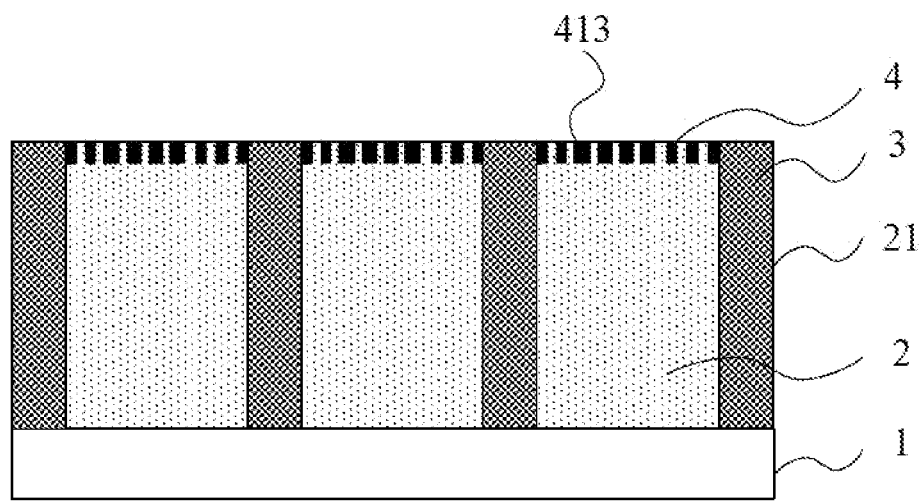
FIG. 6 is a schematic diagram showing a sub-wavelength grating layer and a light filtering layer with light blocking strips of a display substrate according to one embodiment of the present disclosure.
Figure 7:
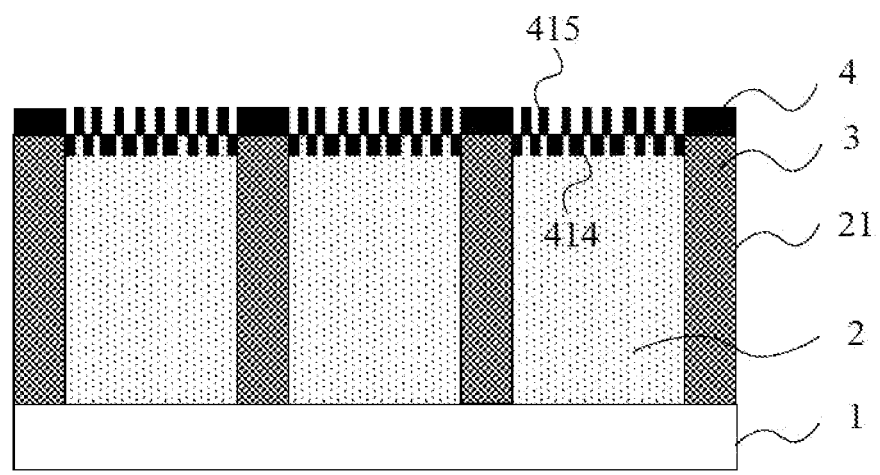
FIG. 7 is a schematic diagram showing a sub-wavelength grating layer and a light filtering layer with light blocking strips of a display substrate according to one embodiment of the present disclosure.

As shown in FIG. 3, the light filtering layer 2 may also be transparent in one embodiment. The display substrate further includes a sub-wavelength grating layer 4 disposed on a side of the base substrate 1 facing the light filtering layer 2 as shown in FIG. 4 or a side of the light filtering layer 2 opposite from the base substrate 1 as shown in FIG. 5, FIG. 6 or FIG. 7. The sub-wavelength grating layer 4 includes a plurality of grating units 41, and the pattern of the grating units 41 includes at least two types of patterns. Each of the patterns of the grating units 41 is configured to selectively transmit light of a color band. The light allowed transmitting through the grating units 41 having different patterns may be different in color.

In one embodiment, the display substrate may include a plurality of sub-pixels arranged in an array, and each of the grating units 41 corresponds to at least one sub-pixel, and each sub-pixel corresponding to the same grating unit 41 may display the same color.

A sub-wavelength grating is a grating whose grating period is similar to the wavelength of light. It has a special polarization characteristic, that is, the transmittance of light oscillating perpendicular to the direction of the sub-wavelength grating is much larger than that parallel to the sub-wavelength grating. Therefore, the sub-wavelength grating layer 4 may replace a polarizing plate in a display substrate.

The sub-wavelength grating also has a narrow-band filtering characteristic, that is, a sub-wavelength grating having a pattern can selectively transmit light of one color band. Therefore, sub-wavelength gratings with different patterns may replace the color films of different colors (color filter portions 23) in the display substrate, thereby simplifying the structure of the display substrate. In one embodiment, for example, a sub-wavelength grating can be used as a red color filter, the pattern of which allows light in the red wavelength range to transmit, whereas the transmittance of light in other color wavelength ranges is extremely low, thereby achieving red color displaying.

In one embodiment, the sub-wavelength grating layer 4 may be a sub-wavelength dielectric grating. For example, a sub-wavelength dielectric grating may be a sub-wavelength quartz ($SiO_2$) grating. In one embodiment, the sub-wavelength grating layer 4 may also be a sub-wavelength metal grating. For example, the material of the sub-wavelength metal grating may be aluminum, chromium, silver, gold or copper.

In some embodiments, the light filtering layer 2 is transparent, and the display substrate further includes a sub-wavelength grating layer 4. The sub-wavelength grating layer 4 includes a plurality of grating units 41. The position and the arrangement of the grating units 41 may vary.

In one embodiment, as shown in FIG. 4, the sub-wavelength grating layer 4 may be disposed on a side of the substrate 1 facing the light filtering layer 2. Each of the grating units 41 includes a plurality of first grating strips 411 spaced apart on a side of the base substrate 1 facing the light filtering layer 2.

In some embodiments, as shown in FIG. 5, FIG. 6, or FIG. 7, the sub-wavelength grating layer 4 may be disposed on a side of the light filtering layer 2 opposite from the base substrate 1.

In one embodiment, as shown in FIG. 5, each of the grating units 41 includes a plurality of second grating strips 412 spaced apart on one side of the light filtering layer 2 opposite from the base substrate 1.

In one embodiment, as shown in FIG. 6, a plurality of grating grooves 22 are arranged on a surface of the light filtering layer 2 opposite from the base substrate 1 in an area corresponding to each of the grating units 41. Each of the grating units 41 includes a plurality of third grating strips 413. The third grating strips 413 are correspondingly located in the grating grooves 22.

In one embodiment, as shown in FIG. 7, a plurality of grating grooves 22 are spaced apart on a surface of the light filtering layer 2 opposite from the substrate 1 in an area corresponding to each of the grating units 41. Each of the grating units 41 includes a plurality of fourth grating strips 414 and a plurality of fifth grating strips 415. The plurality of fourth grating strips 414 are correspondingly located in the plurality of grating grooves 22, and the plurality of fifth grating strips 415 are correspondingly located on the surface of the light filtering layer 2 between two adjacent grating grooves 22.

The grating units 41 of the above various structures according to some embodiments of the present disclosure have narrow-band filtering and polarizing characteristics and may replace the color films and the polarizing plate in the display substrate, thereby simplifying the structure of the display substrate.

In some embodiments, the material of the light filtering layer 2 may include a negative photoresist, and the material of the light blocking strips 3 may include a positive photoresist; or the material of the light filtering layer 2 may include a positive photoresist, the material of the light blocking strip 3 may include a negative photoresist. In some embodiments, the masks for patterning the light filtering layer 2 and for patterning the light-blocking material layer where the light-blocking strips 3 are located are the same or have the same or similar pattern. In the fabrication of the display substrate, the number of times to employ the mask may be reduced, and also the process of fabricating masks with different patterns may be reduced, thereby making the fabrication of the display substrate simpler and more efficient.

In some embodiments, the arrangement of the light blocking strips 3 on the display substrate may vary. In some embodiments, the plurality of light blocking strips 3 in the light blocking grooves 21 include a first type light blocking strips 31 and/or a second type light blocking strips 32. The first type light blocking strips 31 are arranged in a first direction, and the second type light blocking strips 32 are arranged in a second direction. The first direction and the second direction are perpendicular to each other in the plane of the light filtering layer.

Figure 8:
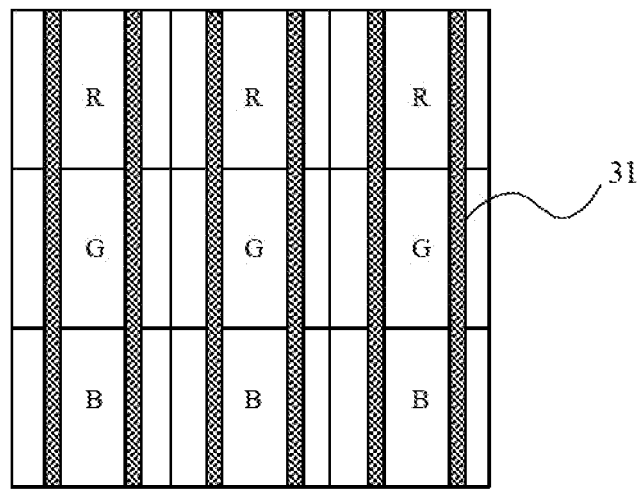
FIG. 8 is a schematic diagram showing an arrangement of light blocking strips of a display substrate according to one embodiment of the present disclosure.

Optionally, the display substrate includes a plurality of sub-pixels arranged in an array, the first direction may be a row direction of the sub-pixels, and the second direction may be a column direction of the sub-pixels. As shown in FIG. 8, the light blocking strips 3 in the light blocking grooves 21 may be the first type light blocking strips 31. The first type light blocking strips 31 may extend along the column direction of the sub-pixels, and be arranged at intervals along of the row direction of the sub-pixels, thereby preventing view at a certain angle from the left and right direction of the display substrate as shown in FIG. 8.

Figure 9:
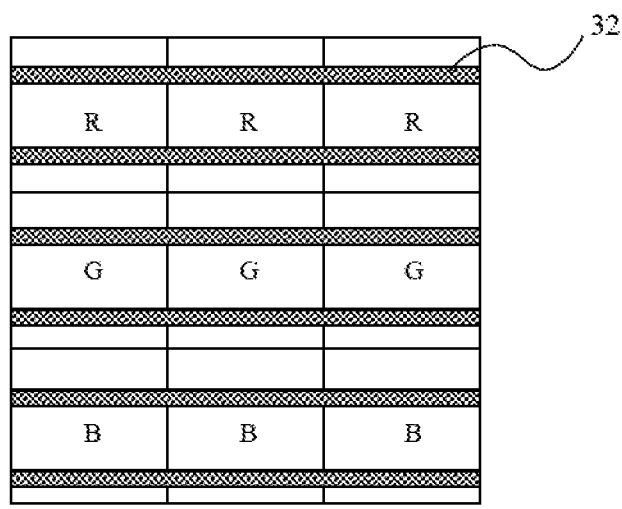
FIG. 9 is a schematic diagram showing an arrangement of light blocking strips of a display substrate according to one embodiment of the present disclosure.

Alternatively, as shown in FIG. 9, the light blocking strips 3 in the light blocking grooves 21 may be the second type light blocking strips 32. The second type light blocking strips 32 may extend along the row direction of the sub-pixels and be arranged at intervals along the column direction of the sub-pixels, thereby preventing the view from a certain angle above and below the display substrate as in FIG. 9.

Figure 10:
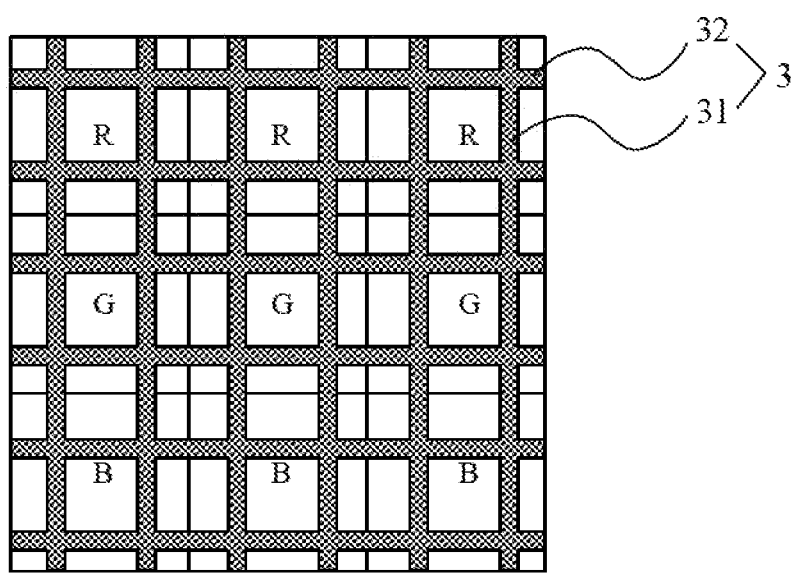
FIG. 10 is a schematic diagram showing an arrangement of light blocking strips of a display substrate according to one embodiment of the present disclosure.

Alternatively, as shown in FIG. 10, the light blocking strips 3 in the light blocking grooves 21 include a plurality of first type light blocking strips 31 extending along a column direction of the sub-pixels and a plurality of second type light blocking strips 32 extending along the row direction of the sub-pixels. The first type light blocking strips 31 are spaced apart in a row direction of the sub-pixels, and the second type light blocking strips 32 are spaced apart in the column direction of the sub-pixels. Therefore, views at certain angles from the left and right direction, and above and below of the display substrate are all blocked, thereby achieving better anti-peep protection.

In some embodiments, the display substrate includes a plurality of sub-pixels arranged in an array. A plurality of light blocking strips 3 passes through a region corresponding to each of the sub-pixels. That is, as shown in FIGS. 1 and 3, a plurality of light-blocking ships 3 passes through each of the sub-pixels, for example, the R sub-pixel, the G sub-pixel, or the B sub-pixel in FIG. 1. Under the same other circumstances, the more the light blocking strips 3 are disposed in the sub-pixels and the smaller the spacing between the light blocking strips 3 is, the smaller the visible range of the user becomes and the better the anti-peep effect becomes.

In some embodiments, the display substrate includes a color filter substrate.

In some embodiments, the display substrate further includes a thin film transistor array. The light filtering layer 2 is disposed on a side of the thin film transistor array opposite from the base substrate 1.

Figure 11:
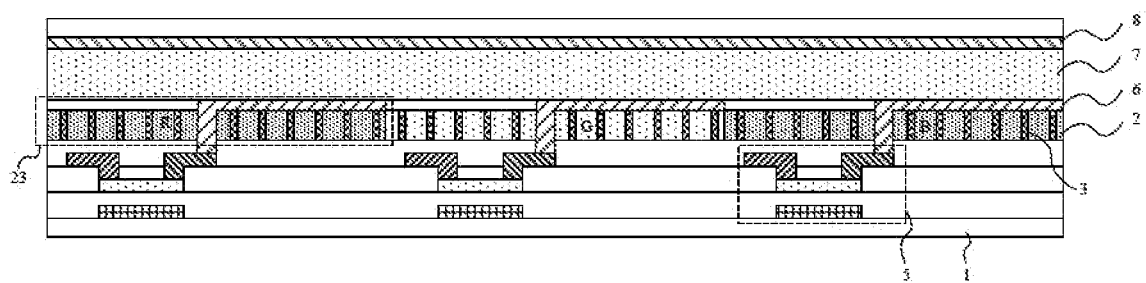
FIG. 11 is a schematic diagram of a display substrate according to one embodiment of the present disclosure.

That is, the light filtering layer 2 in one embodiment may be disposed on a color filter substrate as shown in FIG. 1 and FIG. 3, or disposed on a COA (color filter on array) as shown in FIG. 11. The COA technology is a technique of fabricating a color layer on a thin film transistor array substrate to form a color filter film.

According to some embodiments of the present disclosure, the base substrate 1 may be a base layer when the light filtering layer 2 is formed. For a color filter substrate, a light filtering layer 2 is formed on the base substrate 1. A thin film transistor substrate with a thin film transistor array may be aligned with a color filter substrate and assembled into a cell to form a display substrate. For the COA substrate, in the fabrication of the light filtering layer 2, a thin film transistor array is first formed on the base substrate 1, and then the light filtering layer 2 is formed on the thin film transistor array. Therefore, as shown in FIG. 11, the light filtering layer 2 in the COA substrate is disposed on a side of the thin film transistor array opposite from the base substrate 1.

Another embodiment of the present disclosure further provides a display apparatus, including the display substrate according to some embodiments of the present disclosure.

It should be noted that the display apparatus described in some embodiment may be any type of display apparatuses s that requires anti-peep protection, such as a liquid crystal display apparatus, an OLED display apparatus, and a micro-LED display apparatus.

In addition, the display apparatus in some embodiment may be any product or component having a display function, such as a mobile phone, a tablet computer, a television, a display, a notebook computer, a digital picture frame, a navigator and so on.

The beneficial effects that can be achieved by the display apparatus provided by some embodiments of the present disclosure are the same as or similar to those of the display substrate provided above and are not repeated herein.

Each embodiment in the present disclosure is described in a progressive manner, and the same or similar parts between the various embodiments may be referred to each other, and each embodiment focuses on the differences from the other embodiments. For the methods of some embodiments, because it is basically similar to the product embodiments, the description is relatively simple, and the relevant parts may be referred to the description of the product embodiment.

Figure 12:
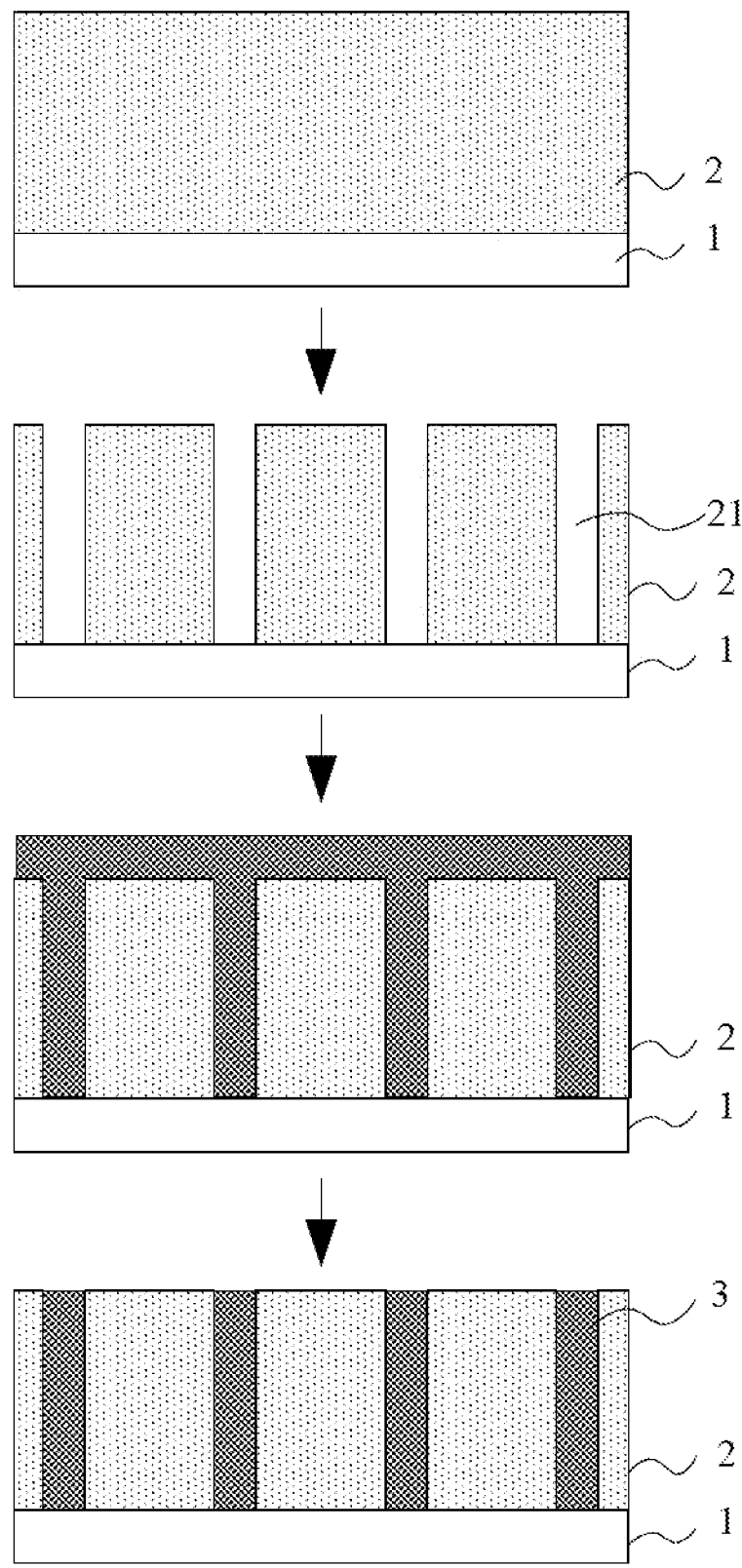
FIG. 12 is a schematic diagram showing a method of fabricating a display substrate according to one embodiment of the present disclosure.

As shown in FIG. 12, another embodiment of the present disclosure further provides a method for fabricating a display substrate, comprising:

providing a base substrate 1, and forming a light filtering layer 2 on the base substrate 1;

performing a first patterning process on the light filtering layer 2, thereby forming a plurality of light blocking grooves 21 in the light filtering layer 2;

covering a layer of light blocking material on the light filtering layer 2, wherein a part of the layer of light blocking material is filled in the plurality of light blocking grooves 21; and removing the layer of light blocking material outside the light-blocking grooves 21 in the light filtering layer 2, thereby forming a plurality of light blocking strips 3.

The beneficial effects that can be achieved by the method of fabricating the display substrate in some embodiments of the present disclosure are the same or similar as those of the display substrate provided above and are not repeated herein.

In some embodiments, the light filtering layer 2 includes a plurality of color filter portions 23. The plurality of color filter portions 23 may include at least two colors. In the process of removing the light blocking material outside the light blocking grooves 21 in the light filtering layer 2, a second patterning process is used to remove the light blocking material. The mask used in the second patterning process may have the same or similar pattern as the one in the first patterning process. The material of the light filtering layer 2 includes a positive photoresist, and the light blocking material may be a negative photoresist. The transparent areas of the mask 9 correspond to the areas of the light blocking grooves 21 in the two patterning processes. Alternatively, the material of the light filtering layer 2 includes a negative photoresist, and the light blocking material may be positive photoresist. The opaque areas of the mask correspond to the areas of the light blocking grooves 21 in the two photolithography processes.

A photoresist is a light-sensitive organic compound that changes its solubility in a developer after exposure to ultraviolet light. The positive photoresist is insoluble to the developer before exposure, and becomes soluble after exposure, and can obtain the same pattern as the opaque areas of the mask. The negative photoresist is soluble in the developer before exposure, and becomes insoluble after exposure, and can obtain the same pattern as the transparent areas of the mask.

The pattern of the masks used in the first and the second patterning processes are the same, that is, the two patterning processes can use the masks with the same or similar pattern, or the same mask. In the fabrication of the display substrate, the processes of fabricating masks with different patterns are reduced, and one mask can be used in different processes, thereby reducing the number of masks required, and making the fabrication of the display substrate simpler and more efficient.

Figure 13:
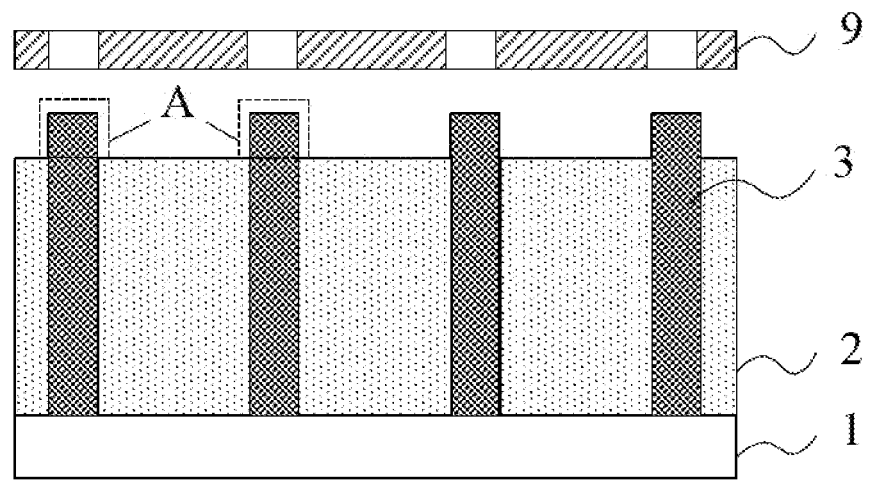
FIG. 13 is a schematic diagram showing a residual region of a light blocking material in a process of removing a light blocking material from a region outside light blocking grooves in a light filtering layer according to one embodiment of the present disclosure.

In the first and second patterning processes using the masks having the same pattern, when removing the light blocking material outside the light blocking grooves 21, there may be residual light blocking material on the areas of the light blocking groove 21, areas A as indicated in FIG. 13. The light blocking material in the areas A may be removed by an ashing process.

In the process of fabricating the display substrate having the sub-wavelength grating layer 4, a mask having a pattern corresponding to the light blocking grooves 21 and the sub-wavelength grating may be used. To design and manufacture the mask, GSolver, Lumerical FDTD solutions, Virtual Lab and other simulation software may be used. By simulating shape, period, duty cycle, thickness and other parameters of the sub-wavelength grating the sub-wavelength grating parameters with the highest transmittance for a desired color can be obtained, thereby obtaining the parameters required to design the mask pattern for the sub-wavelength grating.

In some embodiments, the light filtering layer 2 may be transparent. The method of fabricating the display substrate further includes fabricating the sub-wavelength grating layer 4. The sub-wavelength grating layer 4 includes a plurality of grating units 41, and the grating units 41 may include at least two patterns. Each of the patterns of the grating units 41 is employed to selectively transmit light of a color band, and the grating units 41 of different patterns allows the light of different color bands to transmit.

The sub-wavelength grating layer 4 may be formed before the formation of the light filtering layer 2 on the substrate to obtain a sub-wavelength grating layer 4 as shown in FIG. 4.

In the fabrication of the sub-wavelength grating layer 4, in some embodiments, fabricating the sub-wavelength grating layer 4 includes covering the base substrate 1 with a layer of sub-wavelength grating material, patterning the layer of the sub-wavelength grating material to form a plurality of first grating strip 411 disposed at intervals, wherein each of the grating units 41 includes a plurality of first grating strips 411. The fabricated sub-wavelength grating layer 4 is illustrated in FIG. 4.

In one embodiment, after the light blocking strips 3 are formed in the light filtering layer 2, an ashing treatment is performed to the areas A to flatten the surface of the light filtering layer, and then the surface of the light filtering layer 2 opposite from the base substrate 1 may be coated with a layer of sub-wavelength grating material. The layer of the sub-wavelength grating material may be subjected to patterning, developing, etching, and the like to form a sub-wavelength grating layer 4. The fabricated sub-wavelength grating layer 4 is illustrated in FIG. 4.

Figure 14:
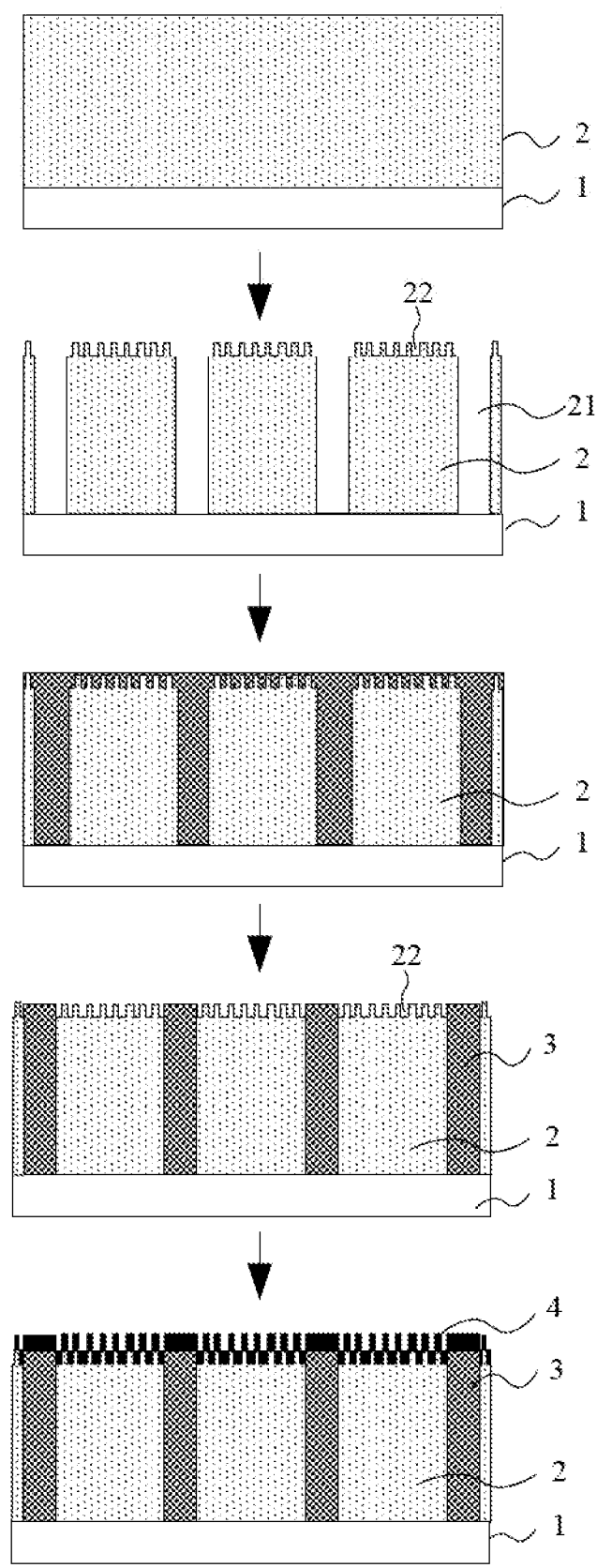
FIG. 14 is a schematic diagram showing a method of fabricating a display substrate according to one embodiment of the present disclosure.

As shown in FIG. 14, the sub-wavelength grating layer 4 may be formed after removing the light blocking material covered outside the light blocking grooves 21 in the light filtering layer 2 to obtain a sub-wavelength grating layer as shown in FIG. 5, FIG. 6, or FIG. 7.

In one embodiment, the step of fabricating the sub-wavelength grating layer 4 includes: after removing the light blocking material covered outside the light blocking grooves of the light filtering layer 2, covering the surface of the light filtering layer 2 opposite from the substrate 1 with a layer of sub-wavelength grating material, patterning the layer of sub-wavelength grating material to form a plurality of second grating strips 412, wherein each of the grating units 41 includes a plurality of second grating strips 412. The fabricated sub-wavelength grating layer 4 is illustrated in FIG. 5.

In another embodiment, the step of fabricating the sub-wavelength grating layer 4 includes: forming a plurality of grating grooves 22 on a surface of the light filtering layer 2 in an area between adjacent two light-blocking grooves 21 corresponding to each of the area of the grating units 41, while forming a plurality of light blocking grooves 21 in the first patterning process of the light filtering layer 2; covering the light filtering layer 2 with a layer of light blocking material and filling part of the light blocking material into the grating grooves 22; removing the light blocking material in the grating grooves 22 in the step of removing the light blocking material covered outside the light blocking grooves 21 in the light filtering layer 2; covering a layer of sub-wavelength grating material on the light filtering layer 2 after removing the light blocking material, thereby forming a sub-wavelength grating layer 4 comprising a pattern of the grating units 41.

In some embodiments, covering the layer of sub-wavelength grating material on the light filtering layer 2 after removing the light-blocking material includes depositing a layer of sub-wavelength grating material on the light filtering layer 2 after removing the light-blocking material by a vapor deposition process, part of the sub-wavelength grating material is filled into the plurality of grating grooves 22 to form a plurality of third grating strips 413 spaced apart, and each of the grating units 41 includes a plurality of third grating strips 413.

The vapor deposition process may be Chemical Vapor Deposition (CVD). Physical Vapor Deposition (PVD) or Plasma Chemical Vapor Deposition (PCVD). In one embodiment, deposition of a sub-wavelength dielectric grating layer may be performed by a Plasma Enhanced Chemical Vapor Deposition (PECVD) process, and a sub-wavelength metal grating layer may be deposited by a sputtering process.

Optionally, as shown in FIG. 6, a sub-wavelength grating material may be deposited on the light filtering layer 2 after removing the light blocking material by a vapor deposition process, and a part of the sub-wavelength grating material is filled into the grating grooves 22 to form a plurality of third grating strips 413. A part of the sub-wavelength grating material is deposited outside the grating grooves 22. This part of the sub-wavelength grating material can be removed by the processes such as exposure, development, and etching to obtain the sub-wavelength grating layer 4 as shown in FIG. 6.

Alternatively, in some embodiments, covering the sub-wavelength grating material on the light filtering layer 2 after removing the light blocking material may also include: depositing a layer of sub-wavelength grating material on the light filtering layer 2 by a vapor deposition process after removing the light blocking material. The thickness of the vapor deposited film layer is generally uniform. A part of the sub-wavelength grating material is filled into the grating grooves 22 to form a plurality of fourth grating strips 414, and a part of the sub-wavelength grating material is deposited on the surface of the light filtering layer 2 between adjacent two grating grooves 22 to form a plurality of fifth grating strips 415. Each of the grating units 41 includes a plurality of fourth grating strips 414 and a plurality of fifth grating strips 415. The fabricated sub-wavelength grating layer 4 is illustrated in FIG. 7. In addition, in a vapor deposition process of forming the fourth grating strips 414 and the fifth grating strips 415, the deposited thickness may be greater than or equal to the depth of the grating grooves 22.

In some embodiments, an ashing process may be employed to remove the light blocking material covered outside the light blocking grooves 21 of the light filtering layer 2. For example, the ashing process can be employed to clean the areas A and also can be used to remove light blocking material.

In some embodiments of the present disclosure, it should be understood that the process of implementing each function in each embodiment can be integrated together to form an independent part, or individual process can independently exist, and also can be integrated into one independent part by two or more processes.

The principles and the embodiments of the present disclosure are set forth in the specification. The description of the embodiments of the present disclosure is only used to help understand the apparatus and method of the present disclosure and the core idea thereof. Meanwhile, for a person of ordinary skill in the art, the disclosure relates to the scope of the disclosure, and the technical scheme is not limited to the specific combination of the technical features, but also covers other technical schemes which are formed by combining the technical features or the equivalent features of the technical features without departing from the inventive concept. For example, a technical scheme may be obtained by replacing the features described above as disclosed in this disclosure (but not limited to) with similar features.

What is claimed is:

1. A display substrate, comprising:
a base substrate,
a light filtering layer on the base substrate,
a plurality of light blocking grooves in the light filtering layer, and
a plurality of light blocking strips in the plurality of light blocking grooves respectively,
wherein the plurality of light blocking, strips are configured to block light from viewing angles outside a visible range of the display substrate;
the light filtering layer is transparent, and the display substrate further comprises a sub-wavelength grating layer, the sub-wavelength grating layer comprises a plurality of grating units having at least two patterns, each of the patterns of the grating units is configured to selectively transmit light of a color band, and different patterns of the grating units allow light of different color bands to transmit; and
the plurality of grating grooves are spaced apart on a surface of the light filtering layer opposite from the substrate, and each of the grating units comprises a plurality of fourth grating strips and a plurality of fifth grating strips, the fourth grating strips are correspondingly disposed in the grating grooves, and the fifth grating strips are correspondingly disposed on surfaces of the light filtering layer between two adjacent grating grooves.

2. The display substrate according to claim 1, wherein a depth of each of the light blocking grooves is equal to a thickness of the light filtering layer within a range of about 50 nm to about 500 nm, and a sidewall of each of the light blocking grooves is perpendicular to the base substrate.

3. The display substrate according to claim 1, wherein the plurality of light blocking strips comprises a first type light blocking strip and/or a second type light blocking strip, the first type light blocking strip is arranged in a first direction, the second type light blocking strip is arranged in a second direction, and the first direction and the second direction are perpendicular to each other in a plane of the light filtering layer.

4. The display substrate according to claim 1, further comprising a plurality of sub-pixels arranged in an array, and more than one of the plurality of light blocking strips passes through a region corresponding to each of the sub-pixels.

5. The display substrate according to claim 4, wherein the light filtering layer comprises a plurality of color filter portions having at least two colors; each of the plurality of color filter portions corresponds to at least one of the sub-pixels, and each sub-pixel corresponding to a same color filter portion displays a same color.

6. The display substrate according to claim 1, wherein the sub-wavelength grating layer is disposed at a side of the base substrate facing the light filtering layer, each of the grating units in the sub-wavelength grating layer comprises a plurality of first grating strips spaced apart at the side of the base substrate facing the light filtering layer.

7. The display substrate according to claim 1, wherein the sub-wavelength grating layer is disposed at a side of the light filtering layer opposite from the base substrate, each of the grating units in the sub-wavelength grating layer comprises a plurality of second grating strips spaced apart at the side of the light filtering layer opposite from the substrate; or
wherein the plurality of grating grooves are spaced apart on the surface of the light filtering layer opposite from the substrate and each of the grating units comprises a plurality of third grating strips, the third grating strips are correspondingly disposed in the grating grooves.

8. The display substrate according to claim 1, wherein a material of the light filtering layer comprises a negative photoresist, and a material of the light blocking strips comprises a positive photoresist; or
a material of the light filtering layer comprises a positive photoresist, and a material of the light blocking strips comprises a negative photoresist.

9. The display substrate according to claim 1, comprising a color filter substrate comprising the light filtering layer.

10. The display substrate according to claim 5, further comprising a thin film transistor array, and the light filtering layer is disposed on a side of the thin film transistor array opposite from the base substrate.

11. A display apparatus, comprising the display substrate according to claim 1.

12. A method of fabricating a display substrate, comprising:
providing a base substrate;
forming a light filtering layer on the base substrate;
performing a first patterning process on the light filtering layer, thereby forming a plurality of light blocking grooves in the light filtering layer;
covering the light filtering layer with a layer of light blocking material, wherein a portion of the light blocking material is filled into the light blocking grooves; and
removing the layer of light blocking material outside the light blocking grooves, thereby forming a plurality of light blocking strips;
wherein the light filtering layer is transparent; the method further comprises forming a sub-wavelength grating layer, the sub-wavelength grating layer comprises a plurality of grating units, the plurality of grating units comprises at least two patterns, each of the patterns of the grating units is configured to selectively transmit light of a color band, and different patterns of the grating units allow light of different color bands to transmit; and
wherein forming the sub-wavelength grating layer comprises:
forming a plurality of grating grooves on a surface of the light filtering layer between adjacent light blocking grooves during the first patterning process to the light filtering layer to form the plurality of light blocking grooves;
filling a portion of the light blocking material in the grating grooves during covering the light filtering layer with the layer of light blocking material;
removing the light blocking material in the grating grooves during removing the layer of the light blocking material outside the light blocking grooves; and
covering the light filtering layer with a layer of sub-wavelength material after removing the light blocking material, thereby forming the sub-wavelength layer comprising a plurality of grating units.

13. The method according to claim 12, wherein removing the layer of light blocking material outside the light blocking grooves comprises performing a second patterning process to remove the light blocking material, and a pattern of a mask used in the first patterning process is the same as that in the second patterning process.

14. The method according to claim 12, wherein covering the light filtering layer with the layer of sub-wavelength material after removing the light blocking material comprises:
depositing the layer of sub-wavelength grating material on the light filtering layer by a vapor deposition process after removing the light blocking material, wherein a portion of the sub-wavelength grating material is filled in the grating grooves, thereby forming third grating strips, and each of the grating units comprises a plurality of the third grating strips; or
depositing the layer of sub-wavelength grating material on the light filtering layer by a vapor deposition process after removing the light blocking material, wherein a portion of the sub-wavelength grating material is filled in the grating grooves, thereby forming fourth grating strips, and a portion of the sub-wavelength grating material is deposited on surfaces of the light filtering layer between adjacent two grating grooves, thereby forming fifth grating strips, and each of the grating units comprises a plurality of the fourth grating strips and a plurality of the fifth grating strips.

15. The method according to claim 12, wherein removing the light blocking material outside the light blocking grooves is performed by an ashing process.

* * * * *